United States Patent
Bales et al.

(10) Patent No.: US 12,500,781 B2
(45) Date of Patent: Dec. 16, 2025

(54) COMPUTER BASED SECURE DATA RECORDS KEEPING

(71) Applicant: T-Mobile Innovations LLC, Overland Park, KS (US)

(72) Inventors: Mark R. Bales, Lee's Summit, MO (US); Lyle T. Bertz, Olathe, KS (US)

(73) Assignee: T-Mobile Innovations LLC

( * ) Notice: Subject to any disclaimer, the term of this patent is extended or adjusted under 35 U.S.C. 154(b) by 60 days.

(21) Appl. No.: 18/644,021

(22) Filed: Apr. 23, 2024

(65) Prior Publication Data
US 2025/0330339 A1    Oct. 23, 2025

(51) Int. Cl.
*H04L 9/00* (2022.01)
*H04L 9/32* (2006.01)

(52) U.S. Cl.
CPC ............... *H04L 9/50* (2022.05); *H04L 9/321* (2013.01)

(58) Field of Classification Search
None
See application file for complete search history.

(56) References Cited

U.S. PATENT DOCUMENTS

| | | | |
|---|---|---|---|
| 11,265,169 B1* | 3/2022 | Rowe | H04L 9/3236 |
| 2020/0045020 A1* | 2/2020 | Soundararajan | H04L 9/321 |
| 2021/0176052 A1* | 6/2021 | Chen | H04L 9/321 |
| 2023/0164145 A1* | 5/2023 | Baumgarte | H04L 63/10 726/4 |
| 2023/0274020 A1* | 8/2023 | Grover | H04L 9/088 713/155 |
| 2023/0412405 A1* | 12/2023 | Hatin | H04L 9/3239 |

\* cited by examiner

*Primary Examiner* — Atta Khan

(57) ABSTRACT

A method of providing access to a blockchain to a third party. The method comprises receiving by a first application a request from the third party to read data from the blockchain, wherein the request identifies an item of data stored in the blockchain; sending by the first application a request to obtain a first encryption key that is operable to decrypt the item of data; receiving the item of data by the first application from a second application; decrypting the item of data by the first application using the first encryption key; identifying a first part and a second part of the item of data by the first application; encrypting the first part of the item of data by the first application using a second encryption key; and sending the encrypted first part of the item of data by the first application to the third party.

20 Claims, 8 Drawing Sheets

COMPUTER BASED SECURE DATA RECORDS KEEPING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Blockchains are data structures that promote storage of data in a substantially immutable format. Normal blocks comprise a hash of a preceding block, a nonce value, a data content, and a hash over the subject normal block. The nonce value is a random number that may be chosen to satisfy a criteria, such as that the hash calculated over the hash of the preceding block, the nonce, and the data content produces a value with four leading zero values. A blockchain may begin with a birth block or genesis block which does not contain a hash of a preceding block, because the birth block is the first block on the blockchain. Once a block is added to a blockchain, it is not changed. Modifying an interior block of a blockchain is possible, but this typically would involve invalidating the blockchain, because the hash values of the blocks would not agree with block contents. Theoretically, an interior block in the blockchain may be modified and then the hashes of all subsequent blocks on the blockchain recalculated and reassigned, but this creates an excessive computational burden that is typically not accepted by hackers. If the value of data in the blockchain is very high, such that a hacker would likely accept the computational burden of rebuilding the blockchain, one or more computer systems may cooperate to establish what the authoritative version of the blockchain is. In this circumstance, the burden of altering the blockchain in an undetectable fashion is increased to discourage hacking. It is the rebuilding burden which makes the blockchain "substantially" immutable—in practical terms, no hacker would invest the effort to alter the blockchain in an undetectable way.

SUMMARY

In an embodiment, a method of providing access to a blockchain to a third party is disclosed. The method comprises receiving by a first application executing on a first computer system a request from the third party to read data from the blockchain, wherein the request identifies an item of data stored in the blockchain; sending by the first application a request to obtain a first encryption key to a key management application executing on a computer system, wherein the first encryption key is operable to decrypt the item of data; and receiving the first encryption key by the first application. The method further comprises receiving the item of data by the first application from a second application associated with the blockchain, where the second application executes on a second computer system; and decrypting the item of data by the first application using the first encryption key. The method further comprises identifying a first part and a second part of the item of data by the first application, wherein the third party is authorized to access the first part of the item of data and is not authorized to access the second part of the item of data; encrypting the first part of the item of data by the first application using a second encryption key known to the third party; and sending the encrypted first part of the item of data by the first application to the third party.

In another embodiment, a method of providing access to a blockchain to a third party is disclosed. The method comprises receiving by a first application executing on a first computer system a request from a third party to write data to the blockchain; sending by the first application a request to obtain a first encryption key to a key management application executing on the computer system; receiving the first encryption key by the first application; and receiving an item of data by the first application from a second application associated with the blockchain, where the item of data is stored in the blockchain and where the second application executes on a second computer system. The method further comprises decrypting the item of data by the first application using the first encryption key; identifying a first part and a second part of the item of data by the first application, wherein the third party is authorized to access the first part of the item of data and is not authorized to access the second part of the item of data; encrypting the first part of the item of data by the first application using a second encryption key known to the third party; and sending the encrypted first part of the item of data by the first application to the third party. The method further comprises receiving a second item of data by the first application from the third party; decrypting the second item of data by the first application using the second encryption key; building a third item of data by the first application that comprises the first item of data and the second item of data; encrypting the third item of data by the first application using the first encryption key; and sending the encrypted third item of data by the first application to the second application to be written into a new block to be added to the blockchain, whereby the third party is able to write to the blockchain.

In yet another embodiment, a method of providing access to a public blockchain is disclosed. The method comprises receiving a first request to access the public blockchain by a first application associated with the public blockchain, wherein the first application executes on a first computer system, wherein some of the blocks of the public blockchain are owned by different owners, wherein the first request identifies a first block in the public blockchain, wherein the first block is owned by a first owner, and wherein the first request identifies an access requestor that is a second owner of one or more blocks in the public blockchain; sending a request rejection by the first application to the access requestor; and receiving a second request to access the public blockchain by a second application executing on a second computer system from the access requestor, wherein the second request identifies the first block in the public blockchain and identifies the access requestor and wherein the second application is associated with the first owner. The method further comprises sending by the second application a request to obtain a first encryption key from a key management application executing on the computer system, wherein the first encryption key is operable to decrypt at least a data portion of the first block; receiving the first encryption key by the second application; and receiving the first block by the second application from the first application. The method further comprises decrypting the data portion of the first block by the second application using the first encryption key; and transmitting data associated with the first block to the access requestor.

In yet another embodiment, a method of providing secure curated access of a third party to a blockchain is disclosed. The method comprises receiving by a first application executing on a computer system a request from a third party to read data from the blockchain, wherein the computer system is disposed in a network domain managed by an owner of the blockchain and wherein the third party is disposed outside the network domain managed by the owner of the blockchain. The method further comprises sending by the first application a request to obtain a first encryption key to a key management application executing on the computer system; receiving the first encryption key by the first application; receiving a first item of data by the first application from a second application associated with the blockchain, where the first item of data is stored in the blockchain and where the second application executes on the computer system; and decrypting the first item of data by the first application using the first encryption key. The method further comprises identifying a first part of the first item of data and a second part of the first item of data by the first application, wherein the third party is authorized to access the first part of the first item of data and is not authorized to access the second part of the first item of data; encrypting the first part of the first item of data by the first application using a second encryption key known to the third party; and sending the encrypted first part of the first item of data by the first application to the third party, whereby the confidentiality of the first part of the first item of data is secured. The method further comprises receiving a second item of data by the first application from the third party, wherein the second item of data is encrypted using the second encryption key, whereby the confidentiality of the second item of data is secured; decrypting the second item of data by the first application using the second encryption key; building a third item of data by the first application that comprises the first item of data and the second item of data; encrypting the third item of data by the first application using the first encryption key; and sending the encrypted third item of data by the first application to the second application to be written into a new block to be added to the blockchain, whereby the third party is able to write to the blockchain.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
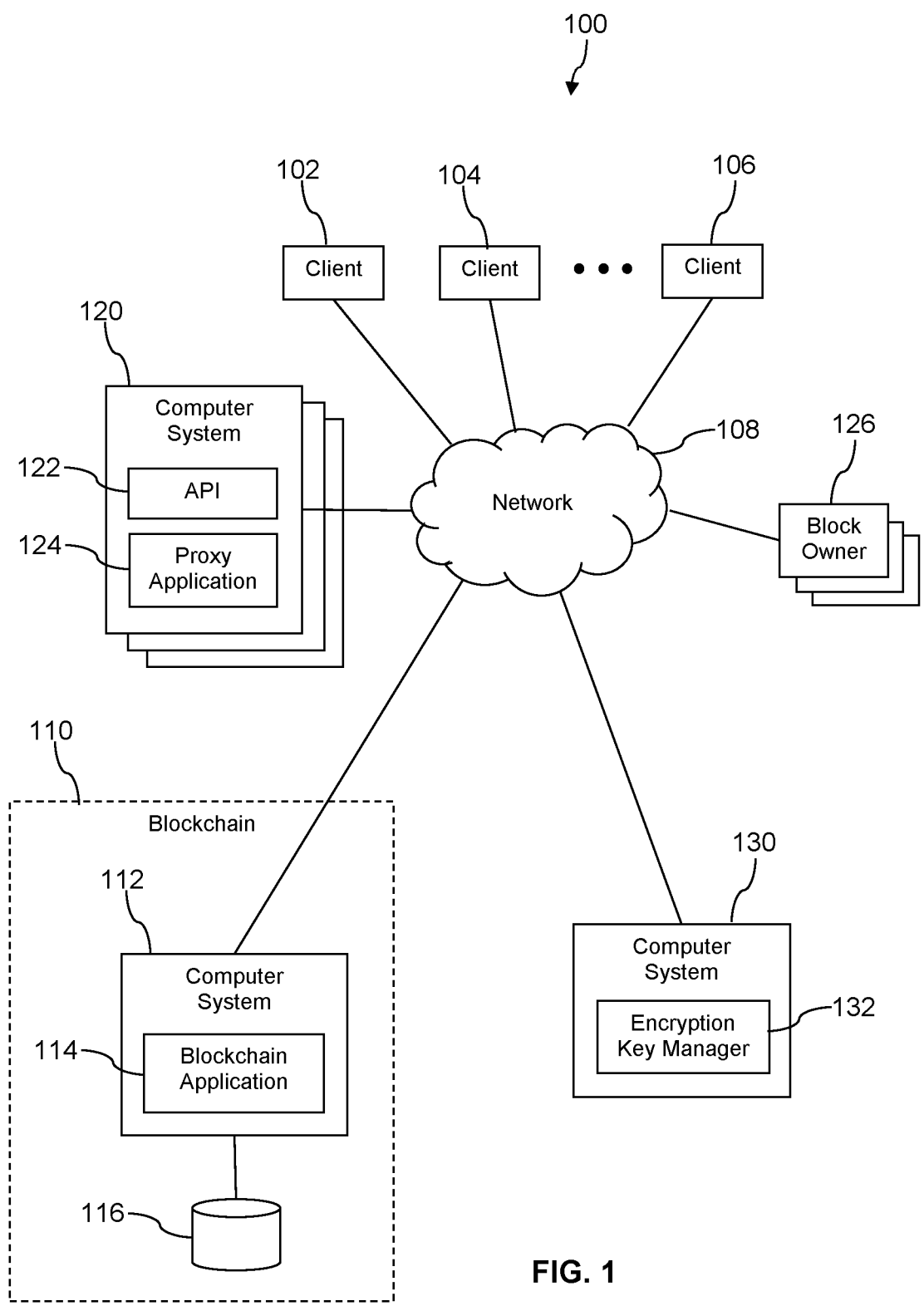
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Blockchains are data structures that retain data in an immutable storage. Technically the data is mutable, but only with a level of difficulty that makes such mutation impracticable or that makes discovery of the mutation easily detectable. For example, undetectably altering the data in the middle of a 1 million block blockchain would entail recalculating hashes of about 500,000 blocks in the blockchain. Various schemes for encrypting the content of the blocks in the blockchain may raise the difficulty of rebuilding a blockchain that has had a block modified.

Typically, blockchains are owned and managed by a single stake holder. If a third party, not the stake holder, wishes to read from the blockchain or add new data to the blockchain, for example by appending a new block to the end of the blockchain, this third party interworks with the stake holder to do this activity on their behalf. This can be an awkward and inefficient process. The present disclosure teaches a new framework whereby an authorized third party can directly engage an automated blockchain interface to access the blockchain. This can be abstracted as the stake holder or owner of the blockchain temporarily conveying ownership of the blockchain, or perhaps ownership of a specific block of the blockchain, to an authorized third party. After the third party has completed its desired access to the blockchain, the loaned ownership is returned to the true owner of the blockchain.

In an embodiment, a client or third party may send a request to access a blockchain to a first application that executes on a computer system. In some contexts, the first application may be referred to as a proxy application. The client identifies the kind of access requested, identifies the client, and optionally identifies a block in the blockchain. The first application requests authorization from an owner of the blockchain, for example a second application executing on a computer system that enacts access policy defined by the owner of the blockchain for accessing the blockchain. If the request is authorized, the first application then may optionally request a first encryption key associated with the block from an encryption key manager. With the first encryption key in hand, if the request is a read access request, the first application may request the content of the identified block from a third application that executes on a computer system and that manages or encapsulates the blockchain. The third application locates the identified block and returns it to the first application. In some contexts, the third application may be referred to as a blockchain encapsulation application. The data content of the block may be encrypted, in which case the first application uses the first encryption key to decrypt the data. It is noted that the first application may execute on a computer system in a domain managed and controlled by the owner of the blockchain. Thus, the first application or proxy application may be considered to be trusted by the owner of the blockchain.

The client may not be authorized to read the entirety of the data content of the requested block. Thus, the first application may identify a first portion of the data content of the requested block that the client is authorized to read and a second portion of the data content of the requested block that the client is not authorized to read. The first application may encrypt the first portion of the data content of the requested block with a second encryption key known to the client and then send the encrypted first portion of the data content to the client.

If the client request is a write request, fulfilling this request entails having a new block added to the end of the blockchain, because blocks once added to the blockchain are immutable and cannot be legitimately changed. This may entail reading data from an existing block, aggregating new data with the existing data, and storing the combination of existing data and new data in a new block on the blockchain. In this case, the first application may decrypt the existing data of the identified block with the first encryption key, decrypt new data received from the client using the second encryption key, aggregate the decrypted existing data and decrypted new data to form a data update, encrypt the data update with the first encryption key, and send the encrypted data update to the third application as a request to build a new block including the encrypted data update and add it at the end of the blockchain.

In an embodiment, the blockchain may be considered to be a public blockchain that has blocks owned by different stake holders rather than by a single stakeholder. In this case, there may be different proxy applications associated with each different blockchain stake holder and a single blockchain encapsulation application that may be deemed public. When a client requests to access a block of the blockchain, this request will need to be presented to the proxy application associated with the owner of the given block. The different proxy applications may be deemed private and each may execute on a computer system managed and/or controlled by the particular one of the plurality of blockchain stake holders. In practice, a system for learning which one of a plurality of proxy applications is associated with a given block in the blockchain is desired.

In an embodiment, the blocks of a public blockchain may comprise an additional field (in addition to the hash of the previous block the nonce, the data content, and the hash over the block itself) that is unencrypted and identifies the proxy application associated with the given block. Thus, the blockchain encapsulation application can read the proxy application identity from the identified block and send that information to any client directly or indirectly. For example, a client may send a block read request to an arbitrarily selected proxy application, and the selected proxy application can request the identity of the proxy application associated with the block from the blockchain encapsulation application. If the selected proxy application matches the identity of the proxy application associated with the block, the selected proxy application can fulfill the access request much as described above. On the other hand, if the selected proxy application is not the same as the proxy application identified as associated with the block, the selected proxy application can return the identity of the proxy application associated with the block to the requesting client. The client can then readdress its request to the proxy application associated with the subject block. The identity of the proxy application associated with the subject block may comprise an address or uniform resource locator of an application programming interface (API) of the proxy application.

Providing secure, convenient access of third parties to private blockchains (e.g., a blockchain owned and managed by an entity different from the third parties) is a technical problem. A particular technical solution is provided herein that may be characterized as a secure, curated access to the blockchain. The third party interworks with a proxy (e.g., the first application) that is within the network domain of the blockchain owner and hence has trusted access to the blockchain. The proxy knows encryption keys of the third parties and can send and receive messages to/from the third parties; the proxy knows encryption keys used by the blockchain wrapper (e.g., the third application) and uses these to secure communication with that blockchain wrapper. In an embodiment, the proxy requests the encryption keys from a key management application (e.g., the second application).

Turning now to FIG. 1, a system 100 is described. In an embodiment, system 100 comprises a plurality of clients communicating via a network 108 with a blockchain 110. For example, a first client 102, a second client 104, and a third client 106 may interact with the blockchain 110. The blockchain 110 may be implemented by a computer system 112 executing a blockchain application 114 and by a data store 116. Computer systems are described further below. The blockchain 110 may store a plurality of blocks where each block contains data in an immutable structure. In an embodiment, the blockchain application 114 may be a distributed application and the blockchain 110 may be implemented as a distributed ledger. The clients 102, 104, 106 may be applications that execute on computer systems such as wearable computers, hand-held computers, laptop computers, notebook computers, tablet computers, or server computers. One or more of the clients 102, 104, 106 may executed on a smart phone. In some contexts, the clients 102, 104, 106 may be referred to as third parties, as the clients may be associated with enterprises, organizations, or individuals outside of an enterprise or organization that own and operate the blockchain 110.

The system 100 further comprises a computer system 120 that executes an application programming interface (API) 122 and a blockchain proxy application 124. As will be discussed further below, clients 102, 104, 106 send blockchain access requests to the API 122, and the blockchain proxy application 124 enacts those access requests. In an embodiment, the blockchain proxy application 124 may be a distributed application. In an embodiment, the computer system 120 and the computer system 112 may be controlled by the same entity, for example a blockchain owner or an enterprise or a government organization. In an embodiment, the computer system 120 and the computer system 112 may be the same computer system. In an embodiment, the computer system 120 and the computer system 112 may be provided by a cloud computing environment. The network 108 comprises one or more public networks, one or more private networks, or a combination thereof. While three clients 102, 104, 106 are illustrated in FIG. 1, it is understood that the system 100 may comprise one client, two clients, or more than three clients but less than 500 million clients.

When a client 102, 104, 106 requests to access the blockchain 110, a block owner 126 may be asked to approve its access. For example, the first client 102 sends a request to read a specific block from the blockchain 110 to the API 122. The API 122 passes the request to the proxy application 124, and the proxy application 124 first asks for access permission from an owner of the given block from the block owner 126. If permission, is given, the proxy application 124 may proceed with the access. In an embodiment, the block owners 126 are implemented by computer systems executing an access permission policy application that automatically evaluates whether to grant or deny access to clients 102, 104, 106. If permission is not granted by the block owner 126, the API 122 returns a request denied message to the first client 102.

If the block owner 126 authorizes the requested access, the proxy application 124 may request a first encryption key from an encryption key manager 132 executing on a computer system 130. In an embodiment, the computer system 130 may be the same computer system as the computer system 120 or the computer system 112. Alternatively, the computer system 130 may be a separate computer system, for example a computer in a cloud computing environment. The request for the first encryption key may identify a block of the blockchain 110. The request for the first encryption key may identify a block owner 126 associated with the block of the blockchain 110. The encryption key manager 132 looks up the first encryption key and returns it to the proxy application 124.

The proxy application 124 may then request data of the identified block of the blockchain 110 from the blockchain application 114. The blockchain application 114 provides a framework for establishing and maintaining the data store 116 that embodies the blockchain (e.g., the blocks associated together in a chain). All access to the actual blocks of the blockchain 110 is brokered by the blockchain application 114. From one view point, the blockchain application 114 may be abstracted as the blockchain. The blockchain application 114 trusts the proxy application 124 and assumes that access requests that it receives from the proxy application 124 have been properly authenticated and authorized by the proxy application 124. The blockchain application 114 accesses the identified block and sends the data from the subject block to the proxy application 124.

In some cases, the data stored in the identified block is encrypted with the first encryption key. In this case, the proxy application 124 decrypts the data returned by the blockchain application 114 using the first encryption key. If the data is not encrypted, the proxy application 124 does not decrypt the data. In either case, the proxy application 124 returns the requested data via the API 122 to the first client 102. The first client 102 then consumes the data.

In some cases, the first client 102 may not be authorized to see all the data stored in an identified block. For example, the subject block may have data that consists of a first data part which the first client 102 is authorized to read and a second data part which the first client 102 is not authorized to read. In this case, the proxy application 124 suppresses the second data part and returns the first data part, via the API 122, to the first client 102. The first client 102 then consumes the data. In an embodiment, it may be preferred that the data returned to the first client 102 be encrypted. In this case, the first data part may be encrypted with a second encryption key known to the first client 102 and to the proxy application 124. In this case, the API 122 returns the first data part encrypted with the second encryption key to the first client 102. The first client 102 decrypts the first data part with the second encryption key and consumes that data.

In some cases, the access requested by the clients 102, 104, 106 may be to write data to the blockchain 110. In this case, much of the same process is followed as with reading, except that the client 102, 104, 106 also provides the data to be written. In some cases, the data sent by the client 102, 104, 106 is to be the only data to be provided in the new block that is written by the blockchain application 114 to the blockchain 110. In another case, however, the client 102, 104, 106 makes a write request that in effect appends data to an existing block. Of course, no existing block can be altered, so the process entails reading data out of the identified block by the proxy application 124, aggregating the data supplied by the client 102, 104, 106 with the pre-existing data, and requesting the blockchain application 114 to create a new block having data that consists of the aggregation of the existing data in the block identified in the write request and the new data.

Figure 2:
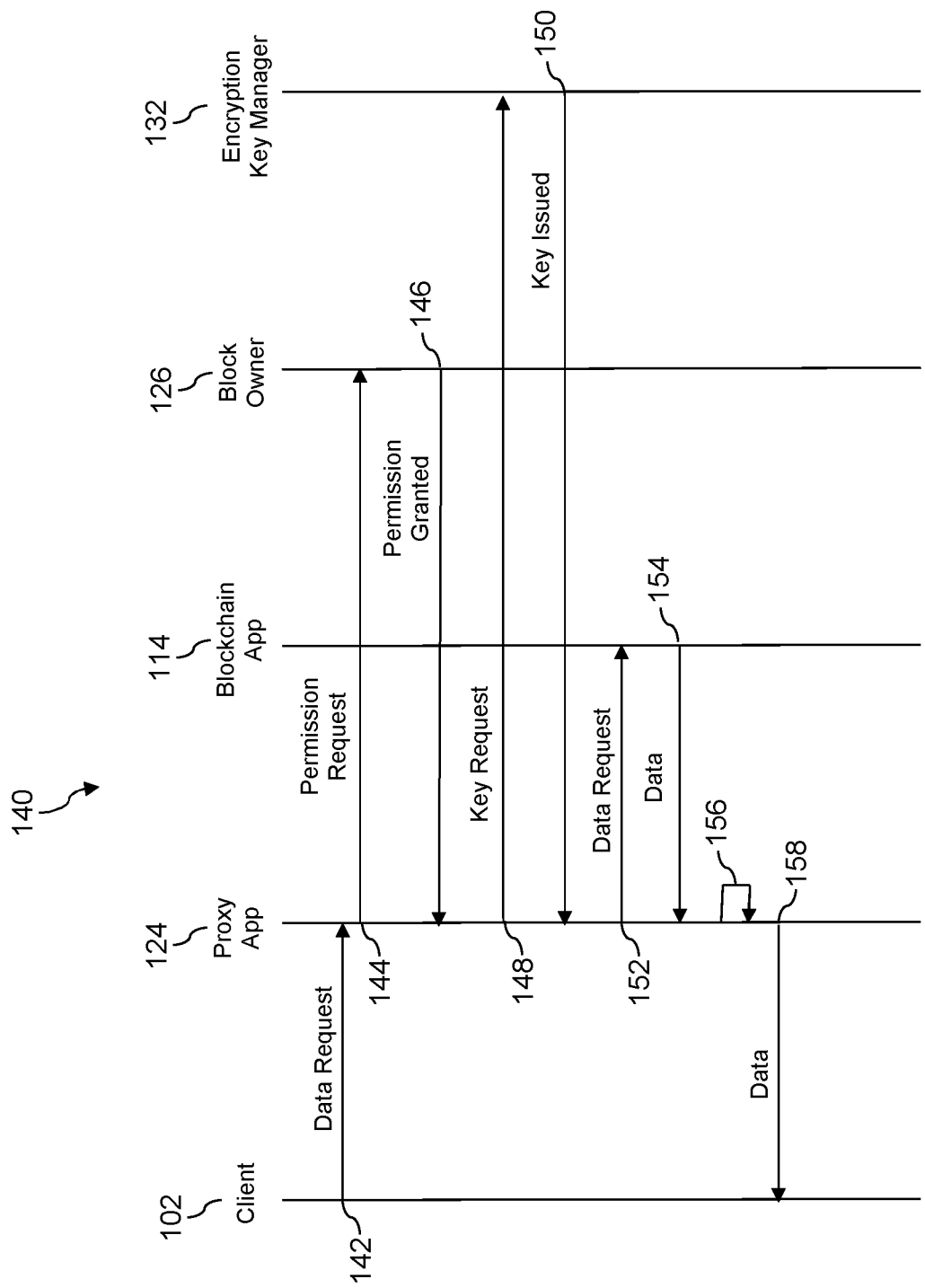
FIG. 2 is a message sequence diagram according to an embodiment of the disclosure.

Turning now to FIG. 2, a message sequence 140 is described. The message sequence 140 may be generally followed when fulfilling an authorized client's read access to a blockchain. At label 142, the first client 102 sends a request to read a block from the blockchain 110. While FIG. 2 represents the request being sent to the proxy application 124, in an embodiment the client 102 sends the request to the API 122, and the API 122 sends the request to the proxy application 124. The request may provide an identity of the first client 102 and/or an authentication/authorization token associated with the first client 102. The request may identify a block stored in the blockchain 110, for example stored in the data store 116, that the first client 102 wishes to read. In an embodiment, the proxy application 124 may authenticate and or confirm authorization of the first client 102 to submit a request to access the blockchain 110. For example, access to the blockchain 110 may be permitted to a delimited list (e.g., a white list) of clients 102, 104, 106 that have made arrangements to receive the desired access. The proxy application 124 may authenticate and/or check the authorization of the first client 102 by comparing the identity of the first client 102 or the authorization token provided by the first client 102 against a list of clients 102, 104, 106.

If the first client 102 is generally authorized to send requests to access the blockchain 110, the proxy application at label 144 may request permission from the block owner 126 to grant the requested access to the first client 102. The permission request message identifies the first client 102 and the access type (e.g., a read access or a write access) requested. At label 146, the block owner 126 provides a permission granted reply. The block owner 126 may be represented by an application that executes on a computer system and that automatically carries out an access policy defined by the block owner 126. Alternatively, the block owner 126 may return a permission denied reply. If the proxy application 124 receives a permission denied reply from the block owner 126, the proxy application 124 and/or the API 122 returns an access request denied response back to the first client 102.

At label 148, the proxy application 124 sends an encryption key request to an encryption key manager 132. The encryption key request may identify the subject block that the first client 102 has requested to read. At label 150, the encryption key manager 132 returns a first encryption key to the proxy application 124. The first encryption key may have been used to encrypt a data portion of the data block the first client 102 is requesting to read.

At label 152, the proxy application 124 sends a data request to the blockchain application 114. The data identifies the block requested by the first client 102. The blockchain application 114 looks up the identified block and extracts or makes a copy of the data portion of the block. At block 154, the blockchain application 114 returns the data from the block to the proxy application 124. In an embodiment, the proxy application 124 may be trusted by the blockchain application 114. For example, the proxy application 124 may execute on a computer system located in the same network domain as the computer system on which the blockchain application 114 executes. The proxy application 124 may be trusted by the blockchain application 114 because both the proxy application 124 and the blockchain application 114 are operated and controlled by the same enterprise or organization. Note that while the key request (label 148) and key issuance (label 150) are illustrated as occurring before the data request (label 152) and data return (label 154) in FIG. 2, in an embodiment this sequence may be swapped. Also, the messages can be interleaved. For example, the proxy application 124 may send the encryption key request to the encryption key manager 132 and then send the data request to the blockchain application 114 before the encryption key manager 132 returns the first encryption key to the proxy application 124. Alternatively, the proxy application 124 can send the data request to the blockchain application 114 and then send the encryption key request to the encryption key manager 132 before the blockchain application 114 returns the data to the proxy application 124.

At block 156, the proxy application 124 processes the data received from the blockchain application 114. If the data is encrypted, the proxy application 124 decrypts the data using the first encryption key. In some cases, the first client 102 is not authorized to read all of the data stored in the referenced block, and then the proxy application 124 may partition the data into a first part that the first client is authorized to access and a second part that the first client 102 is not authorized to access. The proxy application 124 may then encrypt the first portion of data with a second encryption key known to the first client 102 and to the proxy application 124. At label 158, the proxy application returns that encrypted data to the first client 102. If the first client 102 is authorized to read all of the data stored in the referenced block the proxy application 124 does not partition the data and may encrypt all of the data with the second encryption key. It is understood that in some embodiments the data stored in the block at the blockchain may not be encrypted. It is understood that in some embodiments the data returned by the proxy application 124 to the first client 102 may not be encrypted.

Figure 3:
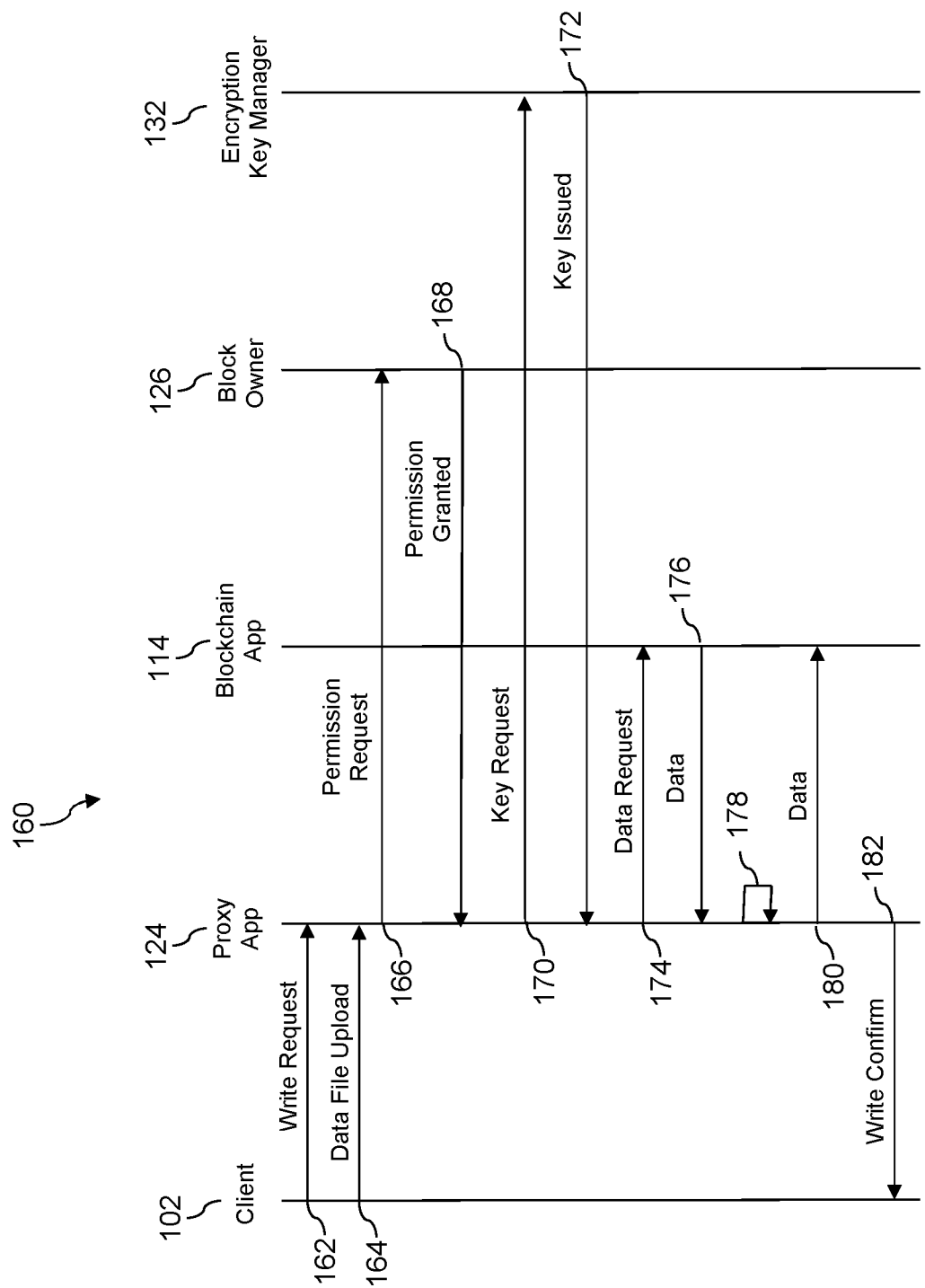
FIG. 3 is another message sequence diagram according to an embodiment of the disclosure.

Turning now to FIG. 3, a message sequence 160 is described. It will be appreciated that much of the messaging and processing in FIG. 3 is substantially similar to that of FIG. 2. At label 162, the first client 102 sends a write request to the proxy application 124. The write request optionally identifies a block that pre-exists in the blockchain 110. Since blocks on the blockchain 110 cannot be altered, such a write request that identifies a pre-existing block proposes to append new data (data being written) to the data content of the pre-existing block to form a new data content that is stored in a new block attached to the end of the blockchain 110. At label 164, the first client 102 sends a message containing a data file to be uploaded into the blockchain 110. In an embodiment, the write request contains the data file and only one message is sent by the first client 102 to initiate the write request. Before acting on the write request, the proxy application 124 may authenticate and/or authorize the first client 102, for example to determine if the first client 102 has the right to write to the blockchain 110. Some clients 102, 104, 106 may have both read and write access to the blockchain 110. Other clients 102, 104, 106 may have only read access and be denied write access to the blockchain 110. Some clients may not have either read or write access to the blockchain 110.

At label 166, the proxy application 124 requests permission from the block owner 126; at label 168, the block owner 126 returns a permission granted message to the proxy application 124. At label 170, the proxy application optionally sends an encryption key request to the encryption key manager 132; at label 172, the encryption key manager 132 returns a first encryption key to the proxy application 124. At label 174, the proxy application 124 optionally sends a data request identifying a block of the blockchain 110 to the blockchain application 114. At label 176, the blockchain application 114 returns the data content from the requested block to the proxy application 124. In a write scenario that does not involve extending or updating data that is pre-existing in the blockchain 110, the messaging associated with labels 174, 176 are unnecessary.

At block 178, the proxy application 124 processes the write request. If the first client 102 identified a pre-existing block to be updated or extended, the proxy application 124 optionally may decrypt the data returned from the blockchain application 114 using the first encryption key. The proxy application 124 optionally may decrypt the data file uploaded at label 164 (or included in the write request at label 162) using a second encryption key known to the first client 102 and to the proxy application 124. The proxy application 124 may aggregate data from a pre-existing block fetched from the blockchain application 114 at label 174 with the data received from the first client 102. This aggregation may involve interleaving the pre-existing data with the data received from the first client 102. This aggregation may involve appending the data received from the first client 102 after the pre-existing data. In an embodiment, in the case the first client 102 is updating the pre-existing data, the proxy application 124 may replace at least some of the pre-existing data received from the blockchain application 114. The result of this processing is a chunk of data that the proxy application 124 will send at label 180 to the blockchain application 114 as a request to build a new block containing the new data and attaching this new block onto the blockchain. In an embodiment, the proxy application 124 provides the identity of the pre-existing block that is being updated or extended at label 180 to the blockchain application 114, and the blockchain application 114 adds a reference to the pre-existing block into the new block it adds to the blockchain 110, whereby to provide a historical link to the precursor of the new block. In an embodiment, the proxy application 124 encrypts the chunk of data using the first encryption key before sending it to the blockchain application 114.

In an embodiment, the first client 102 does not identify a pre-existing block in the blockchain 110, and hence the write request involves simply creating a new block containing the new data provided by the first client 102. In this scenario, the proxy application 124 sends the data to the blockchain application 114 without any reference to a pre-existing block in the blockchain 110. In an embodiment, the proxy application 124 encrypts the data received from the first client 102 using the first encryption key and sends this encrypted chunk of data to the blockchain application 114. The blockchain application 114 creates a new block and incorporates the chunk of data into the content field of the new block.

With reference to FIG. 1 again, in an embodiment, the blockchain 110 may be deemed a public blockchain that is conceived to be owned by a plurality of different enterprises and/or organizations. In this case, each different enterprise and/or organization may deploy its own API 122 and its own blockchain proxy application 124 on a computer system 120 that is stationed within its own computer network or in a cloud computing domain that it controls. Access to blocks on the blockchain 110 owned by a given owner desirably is granted via the associated API 122 deployed by that given owner.

In an embodiment, the first client 102 may send a request to access a first block of the blockchain 110 via a first API 122 deployed by a first enterprise associated with the first client 102. The first block of the blockchain 110 may be owned by the first enterprise, so the first API 122 and/or the first blockchain proxy application 124 processes the access request. In an embodiment, the first client may send a request to access a second block of the blockchain 110 via the first API 122. In this case, the second block of the blockchain 110 may be owned by a second enterprise. The first blockchain proxy application 124 tries to access the blockchain application 114, but this access is rejected and the first blockchain proxy application 124 is provided a reference to a second API 122 that is associated with the owner of the second block of the blockchain 110. The first API 122 returns the reference to the second API 122 to the first client 102, and the first client 102 sends the access request to the second API 122, using the reference to the second API 122 provided to it by the first API 122. The second blockchain proxy application 124 then processes the access request.

It is contemplated that the systems and methods for providing secure access to the blockchain 110 as described above and be applied to a wide variety of different use cases. The blockchain proxy application 124 is given this name because, in effect, it serves as the client-facing presence of the blockchain 110 and/or of the blockchain application 114. In effect, the blockchain proxy application 124 and the API 122 "stands in the place of" the blockchain 110 and/or the blockchain application 114 from the viewpoint of the client 102, 104, 106. This proxy role can enhance the security of the blockchain 110 while at the same time providing access to the blockchain 110 to authorized and authenticated clients 102, 104, 106.

In an embodiment, a chain of custody of a purchased article is desirably tracked and reported as the article traverses a plurality of intermediate passages between an original equipment manufacturer (OEM) and a final destination. During the end-to-end passage, the article may transiently be held in the care of different entities. It may be desirable to record the chain of custody in an immutable record that is well secured. The system and methods described herein are well suited to achieving these objectives. An organization may wish that shipment records for its articles be maintained in a secure, immutable way for up to twenty years. But a shipping company may only be legal required to keep such records for three years. The system and methods described herein support one or more shipping companies accessing the blockchain 110 to read and write chain of custody events into the blockchain 110, where the blockchain 110 is controlled and maintained by the organization receiving the articles. Employees of the shipping company or companies can execute clients 102, 104, 106 on personal devices (e.g., mobile phones, laptop computers, tablet computers, notebook computers, wearable computers, and the like) and create and/or update chain of custody events in the blockchain 110 controlled by the organization receiving the shipped articles.

In an embodiment, a client 102, 104, 106 may desire to audit the blockchain 110, develop statistics or summarize data contents of all or some of the blocks in the blockchain 110, build an audit report and store the audit report in the blockchain 110. For example, the auditor (e.g., one of the clients 102, 104, 106) may send a request to write the audit report to the API 122, and the blockchain proxy application 124 may write the report to the blockchain 110 as described herein.

Figure 4:
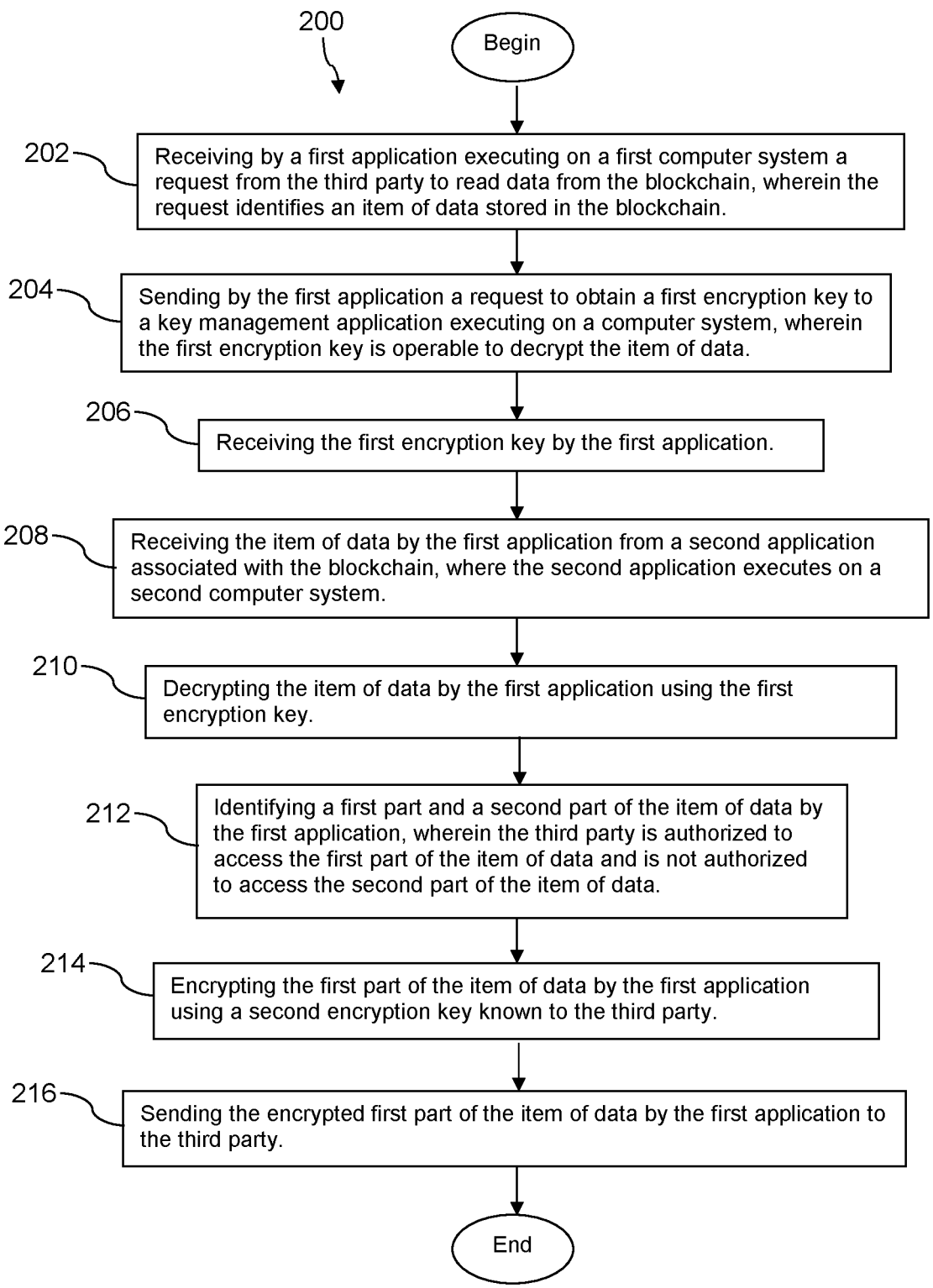
FIG. 4 is a flow chart of a method according to an embodiment of the disclosure.

Turning now to FIG. 4, a method 200 is described. In an embodiment, method 200 is a method of providing access to a blockchain to a third party. In an embodiment, the blockchain is a distributed ledger. At block 202, the method 200 comprises receiving by a first application executing on a first computer system a request from the third party to read data from the blockchain, wherein the request identifies an item of data stored in the blockchain. In an embodiment, receiving the request from the third party by the first application comprises an application programming interface (API) associated with the first application receiving the request from the third party and providing the request to the first application and wherein sending the encrypted first part of the item of data by the first application to the third party comprises the API associated with the first application sending the first part of the item of data to the third party. In an embodiment, a secure communication tunnel is formed between the API and the third party. In an embodiment, a virtual private network (VPN) is formed between the API and the third party. In an embodiment, the method 200 further comprises sending a permission request by the first application on behalf of the third party to an owner of the item of data and receiving permission by the first application from the owner of the item of data. In an embodiment, the first application sends the permission request to a block owner application executing on a computer system, and the block owner application returns permission to the first application based on executing logic embodying a block access policy.

At block 204, the method 200 comprises sending by the first application a request to obtain a first encryption key to a key management application executing on a computer system, wherein the first encryption key is operable to decrypt the item of data. The key management application may execute on the first computer system or on a different computer system. At block 206, the method 200 comprises receiving the first encryption key by the first application. At block 208, the method 200 comprises receiving the item of data by the first application from a second application associated with the blockchain, where the second application executes on a second computer system. In an embodiment, the first computer system and the second computer system are the same computer system, for example one or more server computers executing in a same private network of an enterprise or an organization. In an embodiment, the first computer system and the second computer system are provided by a cloud computing environment.

At block 210, the method 200 comprises decrypting the item of data by the first application using the first encryption key. At block 212, the method 200 comprises identifying a first part and a second part of the item of data by the first application, wherein the third party is authorized to access the first part of the item of data and is not authorized to access the second part of the item of data.

At block 214, the method 200 comprises encrypting the first part of the item of data by the first application using a second encryption key known to the third party. At block 216, the method 200 comprises sending the encrypted first part of the item of data by the first application to the third party.

Figure 5A:
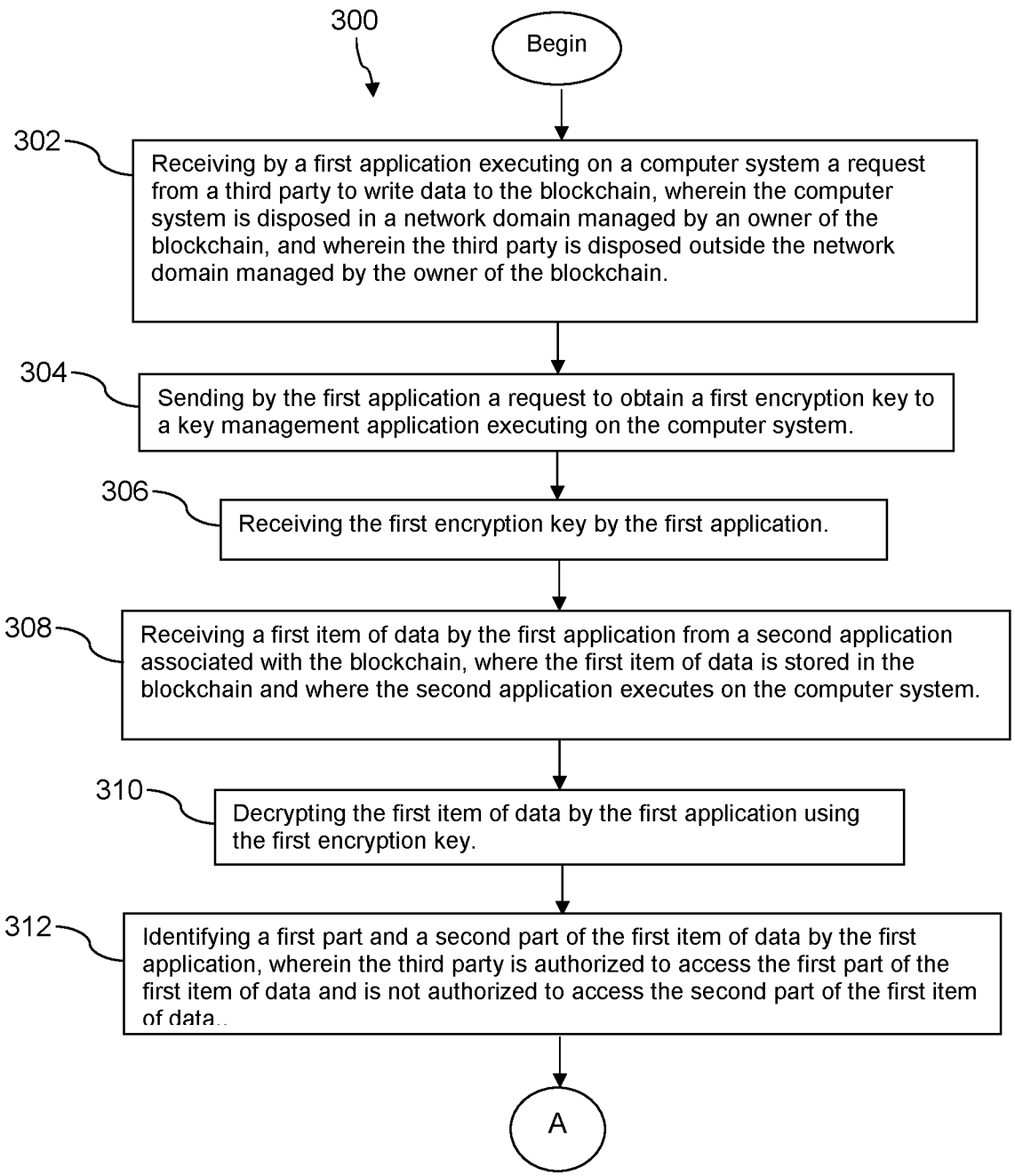
FIG. 5A and FIG. 5B are a flow chart of another method according to an embodiment of the disclosure.
Figure 5B:
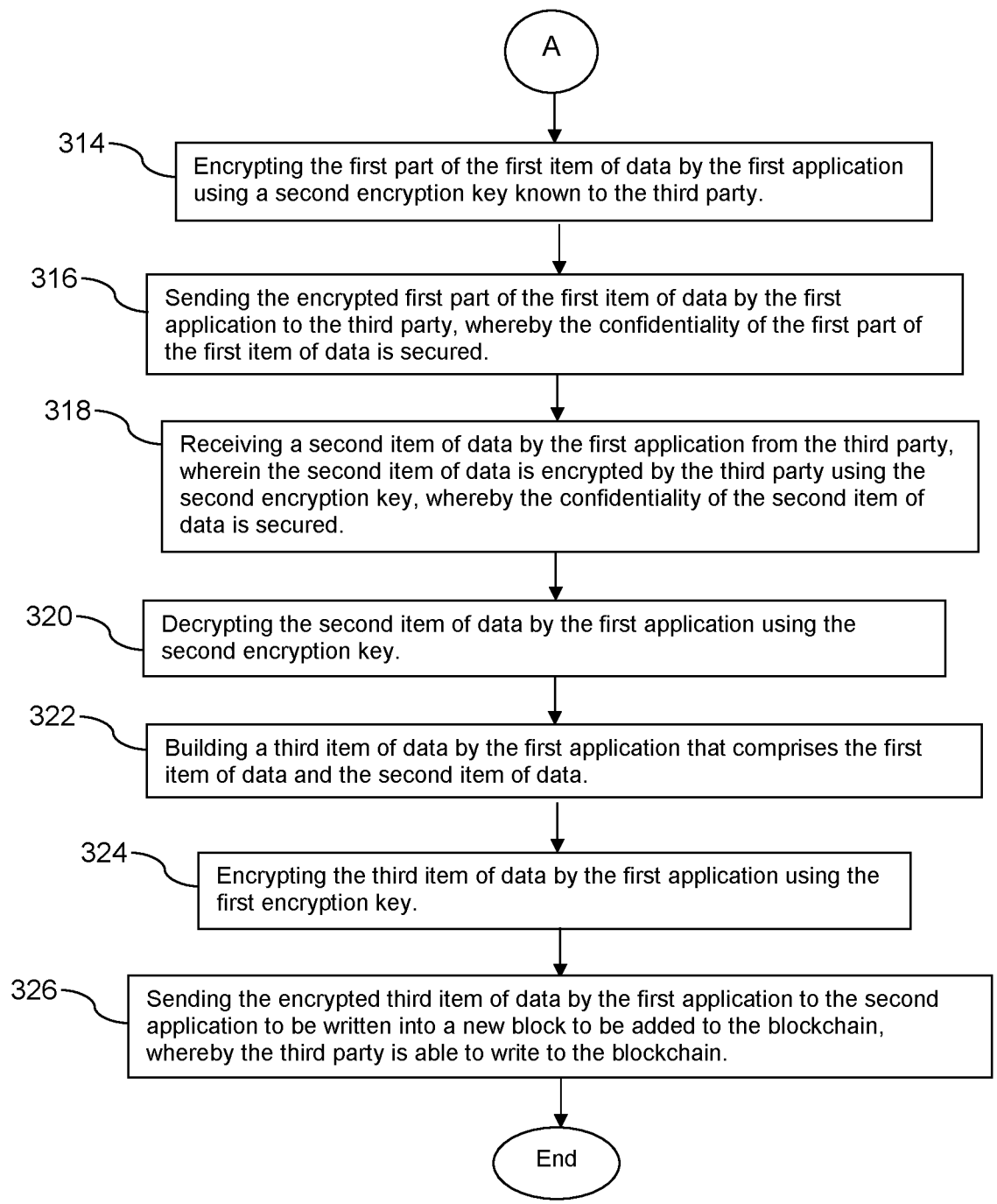

Turning now to FIG. 5A and FIG. 5B, a method 300 is described. In an embodiment, the method 300 is a method of providing secure curated access of a third party to a blockchain. At block 302, the method 300 comprises receiving by a first application executing on a computer system a request from a third party to write data to the blockchain, wherein the computer system is disposed in a network domain managed by an owner of the blockchain and wherein the third party is disposed outside the network domain managed by the owner of the blockchain. In an embodiment, the method 300 further comprises the first application authenticating the third party. In an embodiment, the method 300 further comprises the second application authorizing the third party to indirectly write to the blockchain via the mediation of the first application. In an embodiment, the third party is a client application executing on a hand-held device. In an embodiment, the third party is a client application executing on a smart phone. In an embodiment, the third party is a client application executing on a laptop computer, a notebook computer, or a tablet computer. In an embodiment, the third party is a client application execution on a wearable computer.

At block 304, the method 300 comprises sending by the first application a request to obtain a first encryption key to a key management application executing on the computer system. At block 306, the method 300 comprises receiving the first encryption key by the first application.

At block 308, the method 300 comprises receiving a first item of data by the first application from a second application associated with the blockchain, where the first item of data is stored in the blockchain and where the second application executes on the computer system. In an embodiment, the first application, the key management application, and the second application may execute on different computer servers and/or on different virtual servers that are communicatively coupled to the network domain managed by the owner of the blockchain. It is understood that these computer servers and/or virtual servers may be considered to be part of a single computer system, for example a computer system implemented by a plurality of computers. In an embodiment, the first item of data is an update to data stored in a pre-existing block of the blockchain. At block 310, the method 300 comprises decrypting the first item of data by the first application using the first encryption key.

At block 312, the method 300 comprises identifying a first part and a second part of the first item of data by the first application, wherein the third party is authorized to access the first part of the first item of data and is not authorized to access the second part of the first item of data. At block 314, the method 300 comprises encrypting the first part of the first item of data by the first application using a second encryption key known to the third party.

At block 316, the method 300 comprises sending the encrypted first part of the first item of data by the first application to the third party, whereby the confidentiality of the first part of the first item of data is secured. At block 318, the method 300 comprises receiving a second item of data by the first application from the third party wherein the second item of data is encrypted with the second encryption key, whereby the confidentiality of the second item of data is secured. It is noted that, in an embodiment, the transmission of the encrypted first part of the first item of data by the first application to the third party in block 316 occurs over a portion of the communication network that is outside the network domain managed by the owner of the blockchain and that may be insecure or vulnerable to hackers. Likewise, in an embodiment, the transmission of the second item of data from the third party to the first application in block 318 occurs over the portion of the communication network that is outside the network domain managed by the owner of the blockchain and that may be insecure or vulnerable to hackers. The encryption of the first part of the first item of data and the encryption of the second item of data using the second encryption key can be viewed, in part, as securing access of the third party to the blockchain.

At block 320, the method 300 comprises decrypting the second item of data by the first application using the second encryption key. At block 322, the method 300 comprises building a third item of data by the first application that comprises the first item of data and the second item of data.

At block 324, the method 300 comprises encrypting the third item of data by the first application using the first encryption key. At block 326, the method 300 comprises sending the encrypted third item of data by the first application to the second application to be written into a new block to be added to the blockchain, whereby the third party is able to write to the blockchain. It is noted that the method 300 may be said to provide curated access of the third party to the blockchain in that the access of the third party to the blockchain is mediated by the first application—that is the first application curates and controls the access of the third party to the blockchain.

Figure 6:
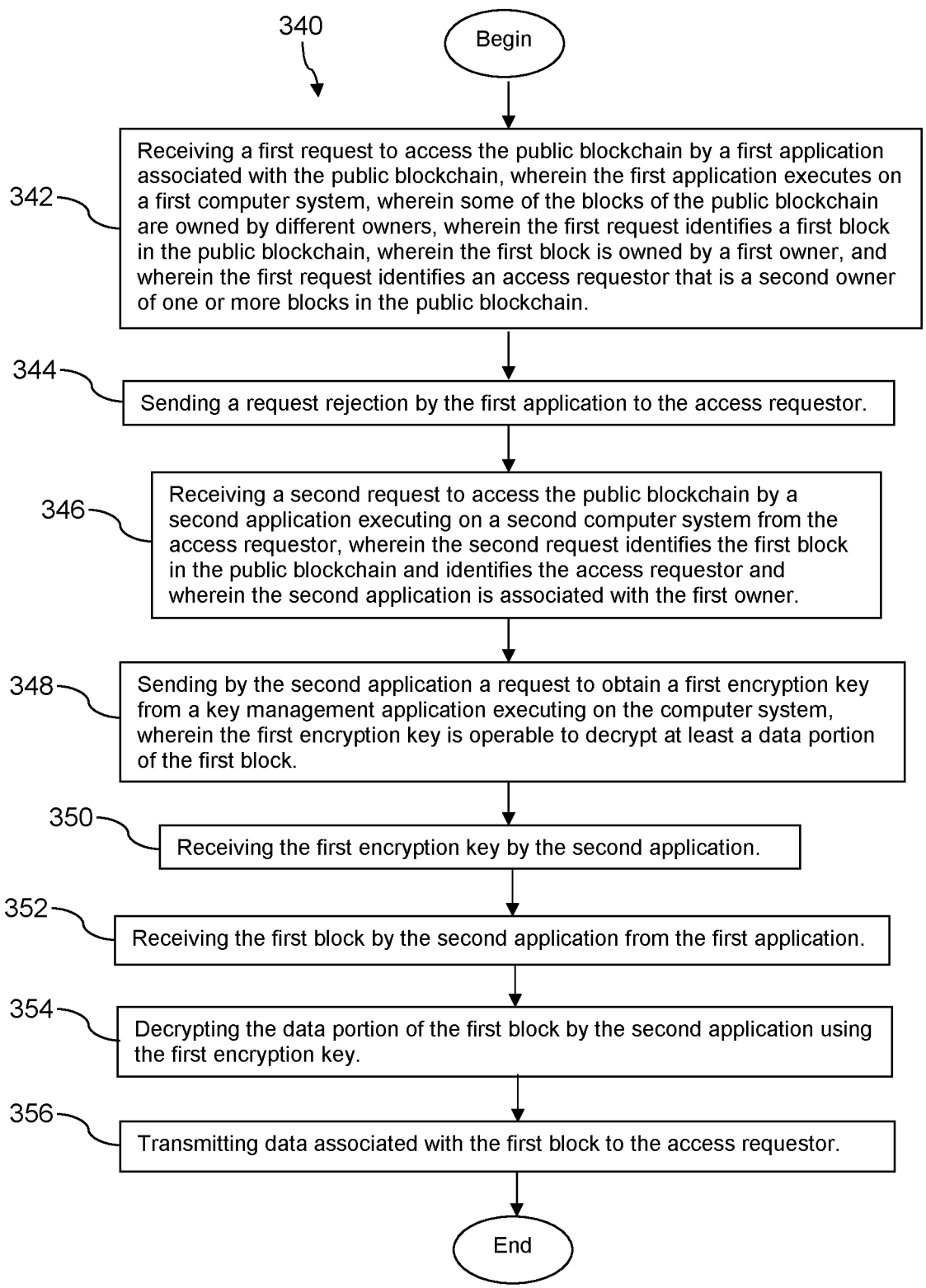
FIG. 6 is a flow chart of yet another method according to an embodiment of the disclosure.

Turning now to FIG. 6, a method 340 is described. In an embodiment, the method 340 is a method of providing access to a public blockchain. At block 342, the method 340 comprises receiving a first request to access the public blockchain by a first application associated with the public blockchain, wherein the first application executes on a first computer system, wherein some of the blocks of the public blockchain are owned by different owners, wherein the first request identifies a first block in the public blockchain, wherein the first block is owned by a first owner, and wherein the first request identifies an access requestor that is a second owner of one or more blocks in the public blockchain.

At block 344, the method 340 comprises sending a request rejection by the first application to the access requestor. In an embodiment, the method 340 comprises determining by the first application a reference to the second application based on an identity of the first owner contained in the first block, wherein the request rejection comprises the referent to the second application. In an embodiment, the reference to the second application is a uniform resource locator (URL) associated with the second application. In an embodiment, the reference to the second application comprises an address of the second application.

At block 346, the method 340 comprises receiving a second request to access the public blockchain by a second application executing on a second computer system from the access requestor, wherein the second request identifies the first block in the public blockchain and identifies the access requestor and wherein the second application is associated with the first owner.

At block 348, the method 340 comprises sending by the second application a request to obtain a first encryption key from a key management application executing on the computer system, wherein the first encryption key is operable to decrypt at least a data portion of the first block. At block 350, the method 340 comprises receiving the first encryption key by the second application. At block 352, the method 340 comprises receiving the first block by the second application from the first application.

At block 354, the method 340 comprises decrypting the data portion of the first block by the second application using the first encryption. At block 356, the method 340 comprises transmitting data associated with the first block to the access requestor. In an embodiment, the data transmitted to the access requestor comprises information about a chain of custody event. In an embodiment, the access requestor is associated with an auditing authority.

Figure 7:
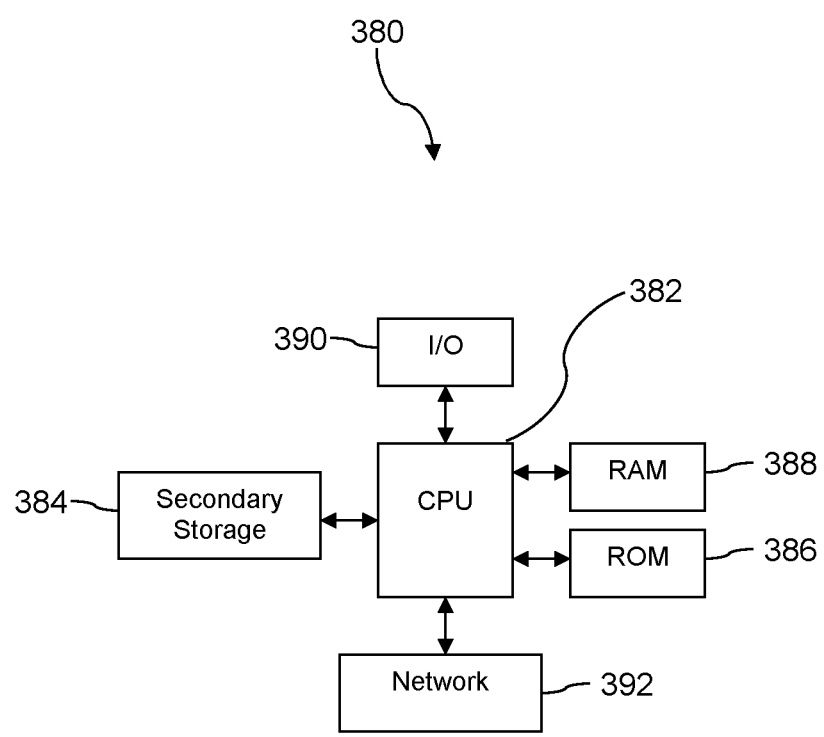
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing secure curated access of a third party to a blockchain, comprising:
   receiving by a first application executing on a computer system a request from a third party to read data from the blockchain, wherein the computer system is disposed in a network domain managed by an owner of the blockchain and wherein the third party is disposed outside the network domain managed by the owner of the blockchain;
   sending by the first application a request to obtain a first encryption key to a key management application executing on the computer system;

receiving the first encryption key by the first application;
receiving a first item of data by the first application from a second application associated with the blockchain, where the first item of data is stored in the blockchain and where the second application executes on the second computer system;
decrypting the first item of data by the first application using the first encryption key;
identifying a first part of the first item of data and a second part of the first item of data by the first application, wherein the third party is authorized to access the first part of the first item of data and is not authorized to access the second part of the first item of data;
encrypting the first part of the first item of data by the first application using a second encryption key known to the third party;
sending the encrypted first part of the first item of data by the first application to the third party, whereby the confidentiality of the first part of the first item of data is secured;
receiving a second item of data by the first application from the third party, wherein the second item of data is encrypted using the second encryption key, whereby the confidentiality of the second item of data is secured;
decrypting the second item of data by the first application using the second encryption key;
building a third item of data by the first application that comprises the first item of data and the second item of data;
encrypting the third item of data by the first application using the first encryption key; and
sending the encrypted third item of data by the first application to the second application to be written into a new block to be added to the blockchain, whereby the third party is able to write to the blockchain.

2. The method of claim 1, wherein the second item of data to be written to the blockchain is an update to data stored in a pre-existing block.

3. The method of claim 1, further comprising the first application authenticating the third party.

4. The method of claim 1, further comprising the second application authorizing the third party to indirectly write to the blockchain via the mediation of the first application.

5. The method of claim 1, wherein the third party is a client application executing on a hand-held device.

6. The method of claim 1, wherein the third party is a client application executing on a smart phone.

7. The method of claim 1, wherein the third party is a client application executing on one of a laptop computer, a tablet computer, or a notebook computer.

8. A method of providing access to a blockchain to a third party, comprising:
receiving by a first application executing on a first computer system a request from the third party to read data from the blockchain, wherein the request identifies an item of data stored in the blockchain;
sending by the first application a request to obtain a first encryption key to a key management application executing on a computer system, wherein the first encryption key is operable to decrypt the item of data;
receiving the first encryption key by the first application;
receiving the item of data by the first application from a second application associated with the blockchain, where the second application executes on a second computer system;
decrypting the item of data by the first application using the first encryption key;
identifying a first part and a second part of the item of data by the first application, wherein the third party is authorized to access the first part of the item of data and is not authorized to access the second part of the item of data;
encrypting the first part of the item of data by the first application using a second encryption key known to the third party; and
sending the encrypted first part of the item of data by the first application to the third party.

9. The method of claim 8, comprising sending a permission request by the first application on behalf of the third party to an owner of the item of data and receiving permission by the first application from the owner of the item of data.

10. The method of claim 8, wherein receiving the request from the third party by the first application comprises an application programming interface (API) associated with the first application receiving the request from the third party and providing the request to the first application and wherein sending the encrypted first part of the item of data by the first application to the third party comprises the API associated with the first application sending the first part of the item of data to the third party.

11. The method of claim 10, wherein a secure communication tunnel is formed between the API and the third party.

12. The method of claim 8, wherein the first computer system and the second computer system are part of the same computer system.

13. The method of claim 8, wherein the first computer system and the second computer system are part of the same private network.

14. The method of claim 8, wherein the blockchain is a distributed ledger.

15. A method of providing access to a public blockchain, comprising:
receiving a first request to access the public blockchain by a first application associated with the public blockchain, wherein the first application executes on a first computer system, wherein some of the blocks of the public blockchain are owned by different owners, wherein the first request identifies a first block in the public blockchain, wherein the first block is owned by a first owner, and wherein the first request identifies an access requestor that is a second owner of one or more blocks in the public blockchain;
sending a request rejection by the first application to the access requestor;
receiving a second request to access the public blockchain by a second application executing on a second computer system from the access requestor, wherein the second request identifies the first block in the public blockchain and identifies the access requestor and wherein the second application is associated with the first owner;
sending by the second application a request to obtain a first encryption key from a key management application executing on the computer system, wherein the first encryption key is operable to decrypt at least a data portion of the first block;
receiving the first encryption key by the second application;
receiving the first block by the second application from the first application;
decrypting the data portion of the first block by the second application using the first encryption key; and transmitting data associated with the first block to the access requestor.

16. The method of claim 15, further comprising determining by the first application a reference to the second application based on an identity of the first owner contained in the first block, wherein the request rejection comprises the referent to the second application.

17. The method of claim 16, wherein the reference to the second application is a uniform resource locator (URL) associated with the second application.

18. The method of claim 16, wherein the reference to the second application comprises an address of the second application.

19. The method of claim 15, wherein the data transmitted to the access requestor comprises information about a chain of custody event.

20. The method of claim 19, wherein the access requestor is associated with an auditing authority.

* * * * *